H. LANDUA.
NUT LOCK.
APPLICATION FILED SEPT. 15, 1913.
1,157,007.
Patented Oct. 19, 1915.
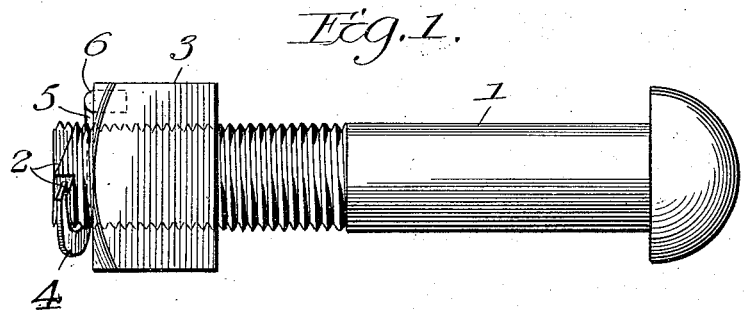
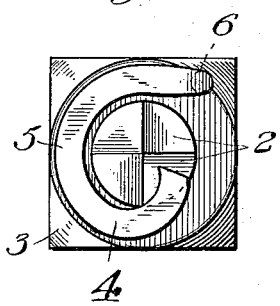
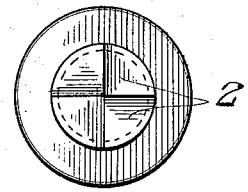
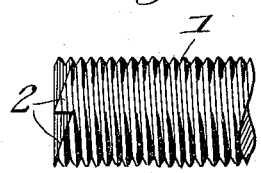
Witnesses
O. M. Wernich
Hazel Ann Jones.
Inventor
Henry Landua
by Max W. Gabel.
Atty.

UNITED STATES PATENT OFFICE.

HENRY LANDUA, OF KIEL, WISCONSIN.

NUT-LOCK.

1,157,007.  Specification of Letters Patent.  Patented Oct. 19, 1915.

Application filed September 15, 1913. Serial No. 789,727.

*To all whom it may concern:*

Be it known that I, HENRY LANDUA, a citizen of the United States, residing at Kiel, in the county of Manitowoc and State of Wisconsin, have invented a certain new and useful Improvement in Nut-Locks, of which the following is a full, clear, concise, and exact description, reference being had to the accompanying drawings, forming a part of this specification.

My invention relates to nut locks, and has for its object the provision of improved means for preventing a nut from becoming loose after having once been put in place upon a bolt. Generally speaking, the means which I provide are automatic in their nature and are so arranged that as the nut is being screwed into place upon the bolt, the means automatically prevent the recoil of the nut, and thus finally hold the nut in position when it has reached its limiting position.

I will explain one form of carrying out my invention more in detail by referring to the accompanying drawing illustrating such embodiment, in which:

Figure 1 is a side view of a nut and bolt constructed in accordance with my invention; Fig. 2 is a top view thereof; Fig. 3 is an end view of the bolt, and Fig. 4 is a side view of a portion of the bolt.

My improved device is adapted for use upon a bolt 1, which bolt has at its end face a plurality of serrations herein shown more or less in the form of a ratchet having teeth 2, 2, four in number. It is of course obvious that there may be more or less teeth as the occasion may require. The nut 3 is provided with a pawl, herein shown in the shape of a spring pawl 4 which is fastened at 5 by having a projection 6 thereof forced into a hole provided therefor in the nut 3. This pawl of course tends to press toward the nut and when the bolt protrudes through the nut as shown in Fig. 1, the pawl rides over the teeth 2 and falls into position back of these teeth, thereby preventing the unscrewing of the nut.

It will be seen that the device is of such a character that the locking feature is automatic and furthermore the lock is positive and acts throughout quite a wide range, by which I mean that the nut may occupy a great many different positions upon the bolt and still be locked in position. The great advantage of thus arranging the parts will be readily apparent, and it will also be apparent that many modifications may be made without departing from the invention defined by the appended claim.

Having however thus set forth one form which my invention may take, what I claim as new and desire to secure by Letters Patent is:

In a device of the character described, a screw threaded bolt having an end face provided with ratchet teeth in a plane at right angles to said bolt, a screw threaded nut adapted to encircle said bolt, and a spring arm extending spirally around the bolt in the direction of its length, said spring arm being secured at one end to the nut and being yieldable substantially from said fixed end to the opposite free end thereof, which said free end is adapted to engage the surface of and press against the ratchet teeth of the bolt whereby to prevent reverse rotation of said nut.

In witness whereof, I hereunto subscribe my name this 27th day of August, A. D. 1913.

HENRY LANDUA.

Witnesses:
  OSEM A. ALTER,
  JOHN CHLENFEH.

Copies of this patent may be obtained for five cents each, by addressing the "Commissioner of Patents, Washington, D. C."